(12) United States Patent
Yeh et al.

(10) Patent No.: US 9,130,375 B2
(45) Date of Patent: Sep. 8, 2015

(54) CHARGER

(71) Applicant: Cipherlab Co., Ltd., Taipei (TW)

(72) Inventors: Chi-Ming Yeh, Taipei (TW); Tung-Han Lee, New Taipei (TW); Ming-Huang Lee, New Taipei (TW); Wang-Hung Chiang, Taipei (TW)

(73) Assignee: CIPHERLAB CO., LTD., Taipei (TW)

( * ) Notice: Subject to any disclaimer, the term of this patent is extended or adjusted under 35 U.S.C. 154(b) by 304 days.

(21) Appl. No.: 13/708,815

(22) Filed: Dec. 7, 2012

(65) Prior Publication Data

US 2014/0084865 A1    Mar. 27, 2014

(30) Foreign Application Priority Data

Sep. 26, 2012  (TW) .............. 101218662 U

(51) Int. Cl.
*H02J 7/00* (2006.01)
(52) U.S. Cl.
CPC ............. *H02J 7/0003* (2013.01); *H02J 7/0044* (2013.01)
(58) Field of Classification Search
CPC ..................................... H02J 7/0045
USPC ......................................... 320/110
See application file for complete search history.

(56) References Cited

U.S. PATENT DOCUMENTS

| 5,256,955 | A |   | 10/1993 | Tomura et al. |
|---|---|---|---|---|
| 5,592,064 | A | * | 1/1997 | Morita ........................... 320/110 |
| 5,742,149 | A | * | 4/1998 | Simpson ....................... 320/113 |
| 5,926,005 | A |   | 7/1999 | Holcomb et al. |
| 6,049,192 | A |   | 4/2000 | Kfoury et al. |
| 6,124,699 | A | * | 9/2000 | Suzuki et al. .................. 320/110 |
| 2008/0079391 | A1 | * | 4/2008 | Schroeck et al. ............. 320/106 |
| 2011/0134601 | A1 | * | 6/2011 | Sa ............................ 361/679.43 |
| 2011/0193523 | A1 | * | 8/2011 | Law ............................... 320/113 |

FOREIGN PATENT DOCUMENTS

| DE | 2702129 A1 | 7/1978 |
|---|---|---|
| EP | 2182608 A2 | 5/2010 |
| EP | 2315322 A1 | 4/2011 |
| WO | 2007102997 A2 | 9/2007 |

OTHER PUBLICATIONS

European Patent Office, "Search Report", for Application No. EP 12196249, dated May 5, 2014, Germany.

* cited by examiner

*Primary Examiner* — Yalkew Fantu
(74) *Attorney, Agent, or Firm* — Locke Lord LLP; Tim Tingkang Xia, Esq.

(57) ABSTRACT

The disclosure provides a charger including a base and a charging circuit. The base includes a coupling portion for detachably coupling with one of multiple supporting stands. Each of the supporting stands has a supporting container with different standards. The coupling portion has a coupling surface. The coupling surface is used for supporting one of the supporting stands. The charging circuit is disposed in the base and the charging circuit has a first electrical connector. The first electrical connector protrudes from the coupling surface. When the coupling portion is coupled with the supporting stand, a portion of the first electrical connector is disposed in the supporting container.

3 Claims, 6 Drawing Sheets

CHARGER

CROSS-REFERENCE TO RELATED APPLICATIONS

This non-provisional application claims priority under 35 U.S.C. §119(a) on Patent Application No(s). 101218662 filed in Taiwan, R.O.C. on Sep. 26, 2012, the entire contents of which are hereby incorporated by reference.

BACKGROUND

1. Technical Field

The disclosure relates to a charger, and more particularly to a charger with changeable supporting stands with different standards.

2. Related Art

Thanks to the ever advancing technology, new and improved computer, communications and consumer electronic products are introduced into the market. Portable electronic products are gradually becoming essential tools in everyday life. The portable electronic products include products such as mobile phone, tablet computer, portable computer, portable scanner and digital camera, etc. Unlike common electronic products, the portable electronic products are not equipped with charging sockets so the portable electronic products have to be charged by using chargers. However, the multiple portable electronic products are different in shapes and standards because there are different brands, different types and models, and furthermore the chargers, produced by different manufacturers, are usually used for electronic products of specific models, a user will have to purchase multiple chargers corresponding to the electronic products which the user owns. In other words, the electronic products cannot share the same charger and the users are therefore forced to purchase different chargers for charging different corresponding electronic products. Furthermore, if the user wants to go on a journey, he/she will have to bring the multiple chargers for the electronic products in order to ensure that the electronic products can be charged if they run out of power.

Therefore, it is highly demanded for developing a charger for charging various electronic products.

SUMMARY

A charger provided in an embodiment of the disclosure comprises a base and a charging circuit. The base comprises a coupling portion for detachably coupling with one of a plurality of supporting stands. Each of the supporting stands has a supporting container with different standards. The coupling portion has a coupling surface. The coupling surface is used for supporting one of the supporting stands. The charging circuit is disposed in the base and the charging circuit has a first electrical connector. The first electrical connector protrudes from the coupling surface. When the coupling portion is coupled with the supporting stand, a portion of the first electrical connector is disposed in the supporting container.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

The detailed features and advantages of the disclosure are described below in great detail through the following embodiments, the content of the detailed description is sufficient for those skilled in the art to understand the technical content of the present disclosure and to implement the disclosure there accordingly. Based upon the content of the specification, the claims, and the drawings, those skilled in the art can easily understand the relevant objectives and advantages of the disclosure.

Figure 1:
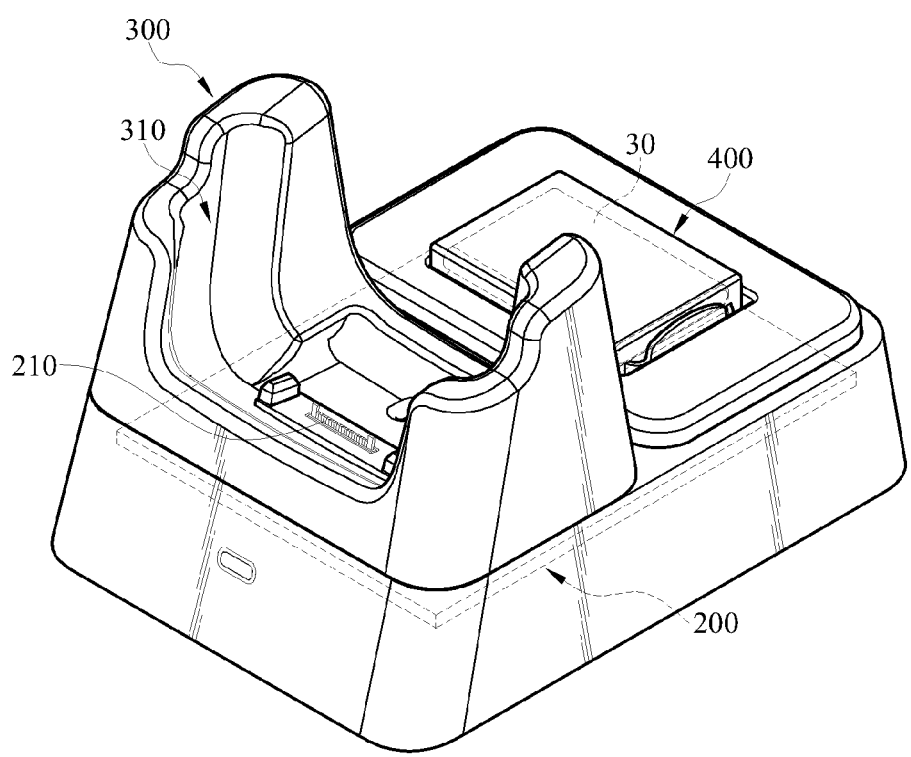
FIG. 1 is a schematic perspective view of a charger according to an embodiment of the disclosure.
Figure 2:
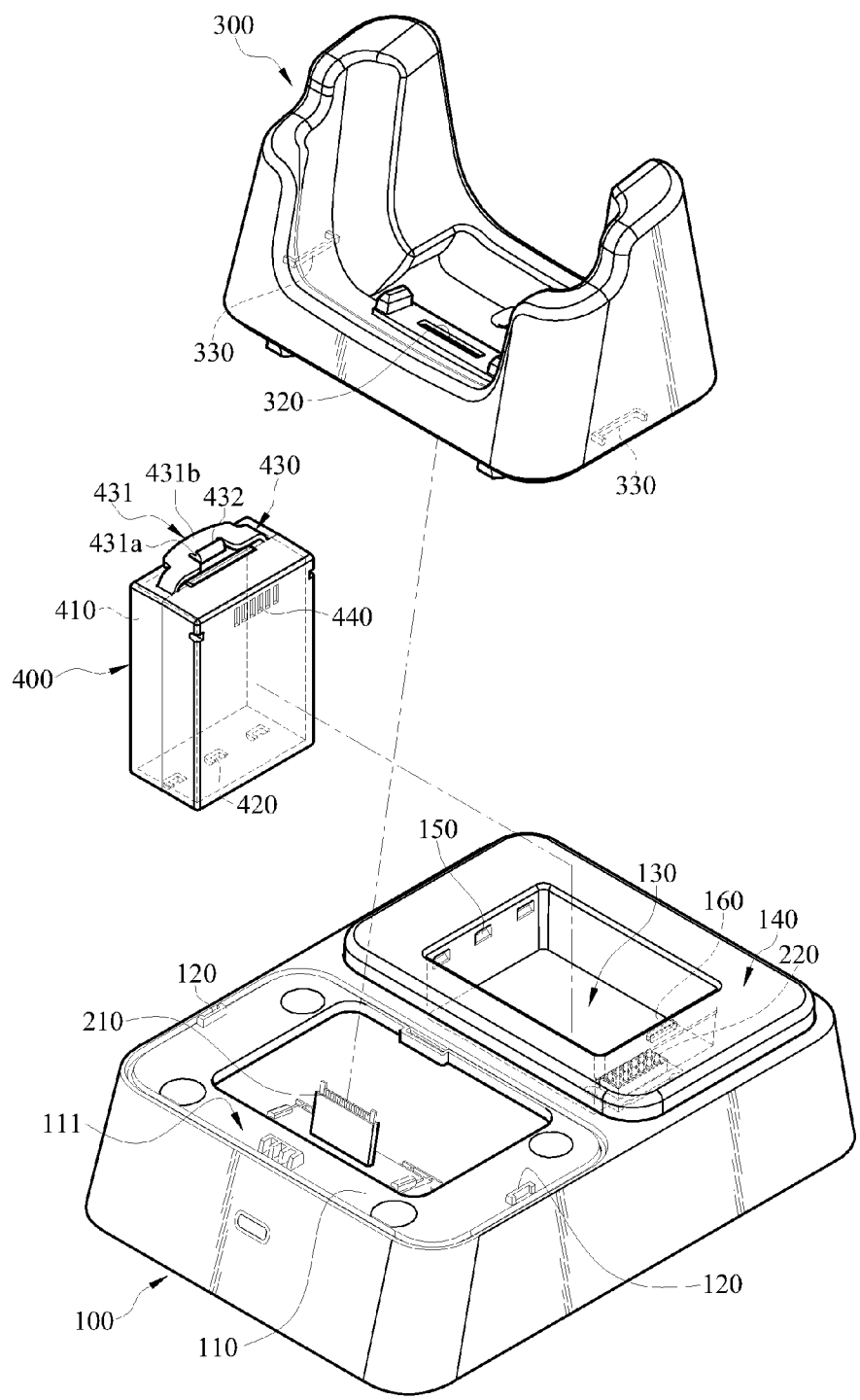
FIG. 2 is an exploded perspective view of FIG. 1.

Please refer to FIGS. 1 and 2. FIG. 1 is a perspective view of a charger according to an embodiment of the disclosure; and FIG. 2 is an exploded perspective view of FIG. 1. A charger 10 of this embodiment has a plug (not shown in the drawings) for connecting with a socket, and electronic products may be charged through the charger 10. The electronic products may be products such as portable computer, portable scanner, tablet computer and mobile phone. The mobile phone is used for the electronic product in this embodiment, but not limited to the disclosure.

The charger 10 in this embodiment comprises a base 100 and a charging circuit 200. The base 100 comprises a coupling portion 110. The coupling portion 110 has a coupling surface 111. The coupling surface 111 is used for supporting one of multiple supporting stands 300. The coupling portion 110 is used for detachably coupling with one of the supporting stands 300. Each of the supporting stands 300 has a supporting container 310 which have different standards with each other. Each of the supporting stands 300 has a slot 320 disposed on a bottom of the supporting container 310 as well as corresponding to the supporting container 310.

The charging circuit 200 is disposed in the base 100. The charging circuit 200 has a first electrical connector 210. The first electrical connector 210 protrudes from the coupling surface 111. When the coupling portion 110 is coupled with the supporting stand 300, the first electrical connector 210 penetrates through the slot 320 such that a portion of the first electrical connector 210 is disposed in the supporting container 310. Therefore, a user can place an electronic product matching the standards of the supporting container 310 on the supporting stand 300 for charging the electronic product.

Furthermore, if the electrical connectors of various electronic products are of the same type and only the shapes of the various electronic products are different, the user only have to substitute another supporting stands 300 which matches the shape of the certain electronic product, and therefore the electronic products with different standards can be charged through the same charger 10. The way of using the charger 10 will be described later.

In this embodiment, the coupling portion 110 comprises two fastening pieces 120. The two fastening pieces 120 are disposed on two opposite sides of the coupling surface 111, respectively. The supporting stand 300 comprises two fastening indentations 330 disposed on two opposite sides of the supporting stand 300, respectively. The two fastening pieces 120 may be detachably fastened with the two fastening indentations 330 correspondingly such that the supporting stand 300 may be detachably fastened on the base 100. Thus, the user can substitute the supporting stand 300 rapidly with the above-mentioned fastening mechanism between the fastening pieces 120 and the fastening indentations 330.

In this embodiment and other embodiments, the base 100 further comprises a coupling indentation 130 and an upper surface 140. The upper surface 140 is connected with the circumference of the coupling indentation 130. The coupling indentation 130 is used for being coupled with one of multiple battery boxes 400. Moreover, the charging circuit 200 further comprises a second electrical connector 220 disposed in the coupling indentation 130. The battery boxes 400 may be detachably installed in the coupling indentation 130. Each of the battery boxes 400 has an accommodating indentation 410 and a third electrical connector 440. The accommodating indentation 410 is used for accommodating at least one battery 30. The third electrical connector 440 is disposed in the accommodating indentation 410 for electrically connecting with the battery 30. Furthermore, the third electrical connector 440 is partially exposed outside the accommodating indentation 410. Therefore, when the battery box 400 is detachably installed in the coupling indentation 130, the third electrical connector 440 may be detachably and electrically connected with the second electrical connector 220.

The following describes the fastening structure between the base 100 and the battery box 400. Each of the battery boxes 400 comprises a first fitting portion 420 and a second fitting portion 430. The first fitting portion 420 and the second fitting portion 430 are disposed on two opposite sides of the battery box 400, respectively. The base 100 comprises a third fitting portion 150 and a fourth fitting portion 160. The third fitting portion 150 and the fourth fitting portion 160 are disposed on two opposite sides of the coupling indentation 130, respectively. When the battery box 400 is installed in the coupling indentation 130, the first fitting portion 420 is fastened with the third fitting portion 150, and the second fitting portion 430 is fastened with the fourth fitting portion 160.

In some embodiments, the first fitting portion 420 is a convex-shaped block, and the third fitting portion 150 is a concave indentation whose shape matches with that of the convex-shaped block. The second fitting portion 430 comprises an elastic piece 431 and a convex-shaped block 432. The elastic piece 431 has a fastening section 431a and a releasing section 431b. The fastening section 431a and the releasing section 431b are connected with each other. The fastening section 431a is connected with the battery box 400, and the fastening section 431a is positioned between the battery box 400 and the base 100. The convex-shaped block 432 is disposed on a surface of the fastening section 431a facing the coupling indentation 130. A portion of the releasing section 431b protrudes from the upper surface 140. The fourth fitting portion 160 is a concave indentation corresponding to the convex-shaped block 432. The convex-shaped block 432 faces the fourth fitting portion 160, and the convex-shaped block 432 is normally fastened with the fourth fitting portion 160 by the elastic piece 431. The user can press the releasing section 431b to make the convex-shaped block 432 move relatively further away from the fourth fitting portion 160 in order to detach the battery box 400 from the coupling indentation 130. Therefore, the battery box 400 with other standards may be substituted later.

Figure 3A:
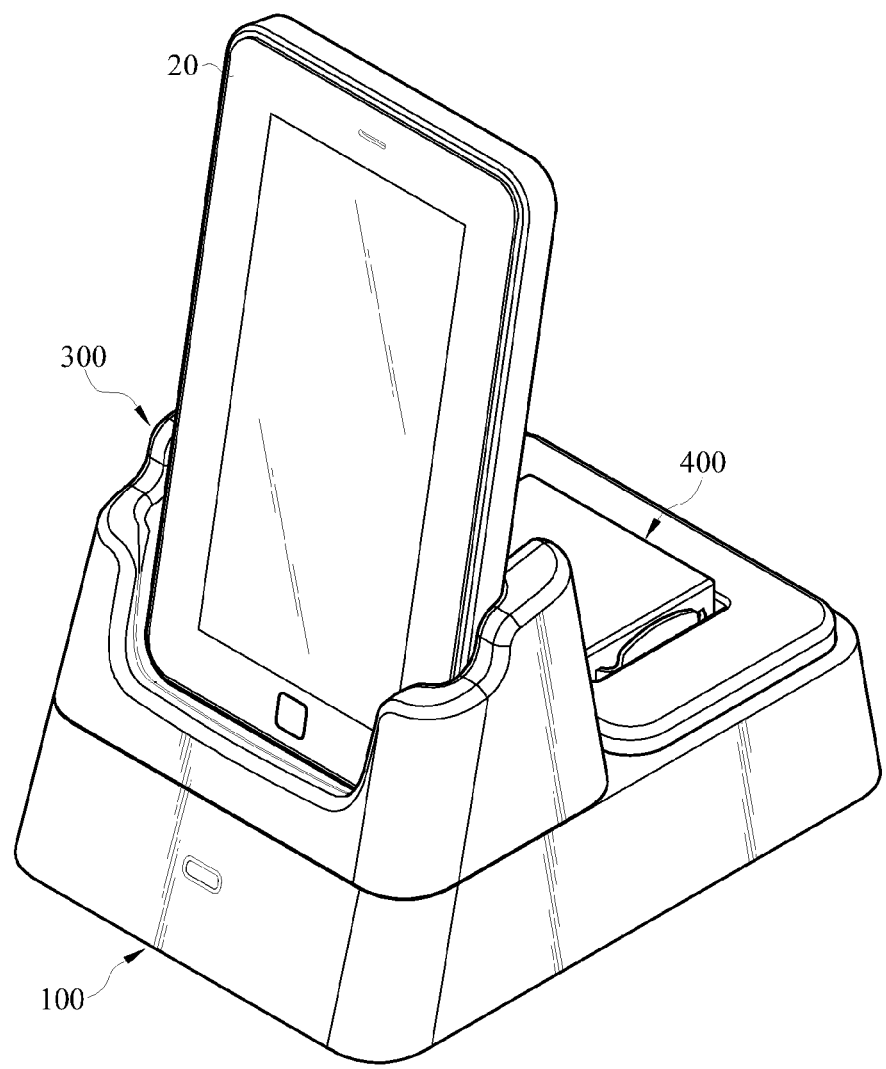
FIGS. 3A to 3C are usage illustrations of FIG. 1.
Figure 3B:
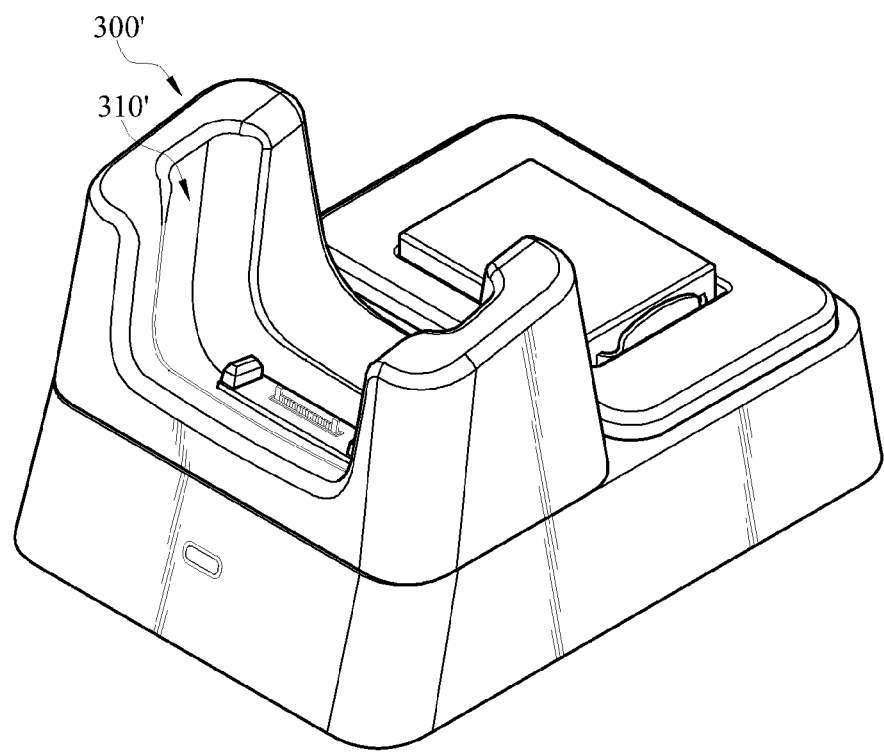
Figure 3C:
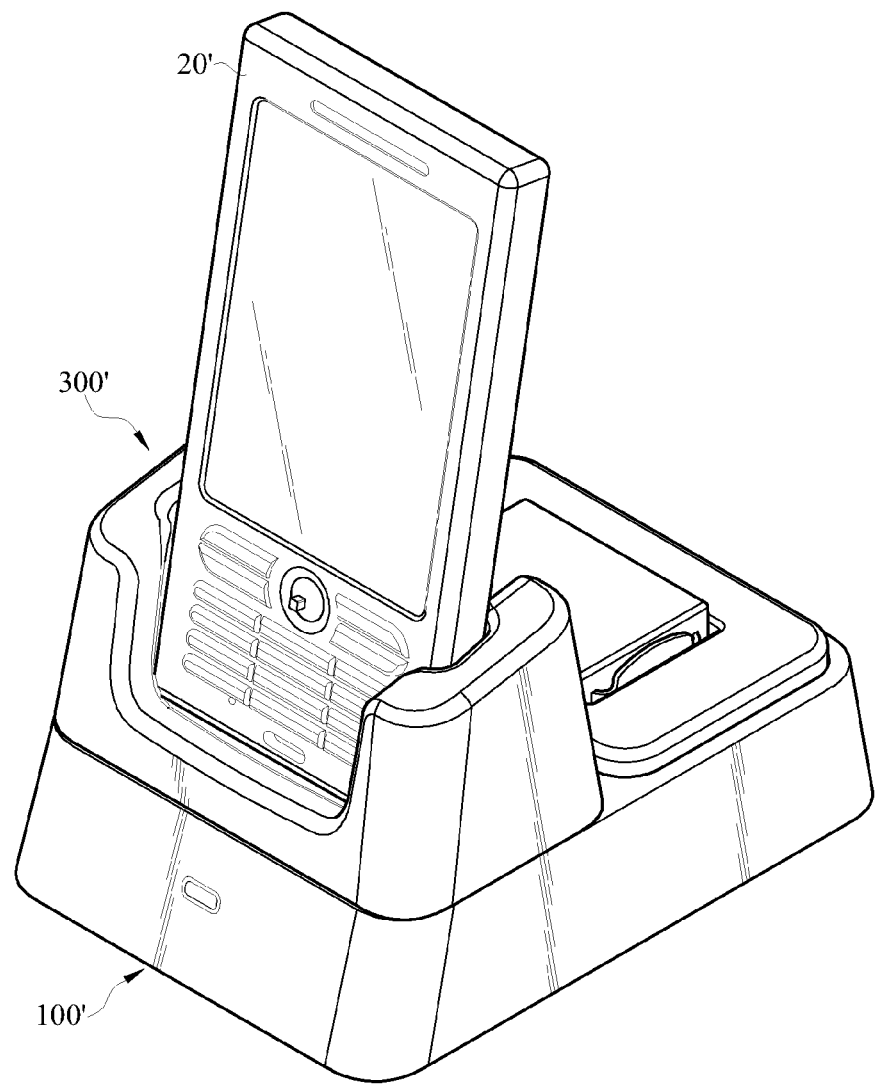

Please refer to FIGS. 3A to 3C. FIGS. 3A to 3C are usage illustrations of FIG. 1. When an electronic product 20 needs to be charged, the electronic product 20 is placed in the supporting container 310 of the supporting stand 300 whose shape matches with that of the electronic product 20 such that the electronic product 20 is electrically connected with the first electrical connector 210 as shown in FIG. 3A. When another electronic product 20' needs to be charged, the user simply substitutes another supporting stand 300' including a supporting container 310' with other standards on a base 100' (as shown in FIG. 3B) for the previous supporting stand 300 in order to charge another electronic product 20'(as shown in FIG. 3C).

Figure 4:
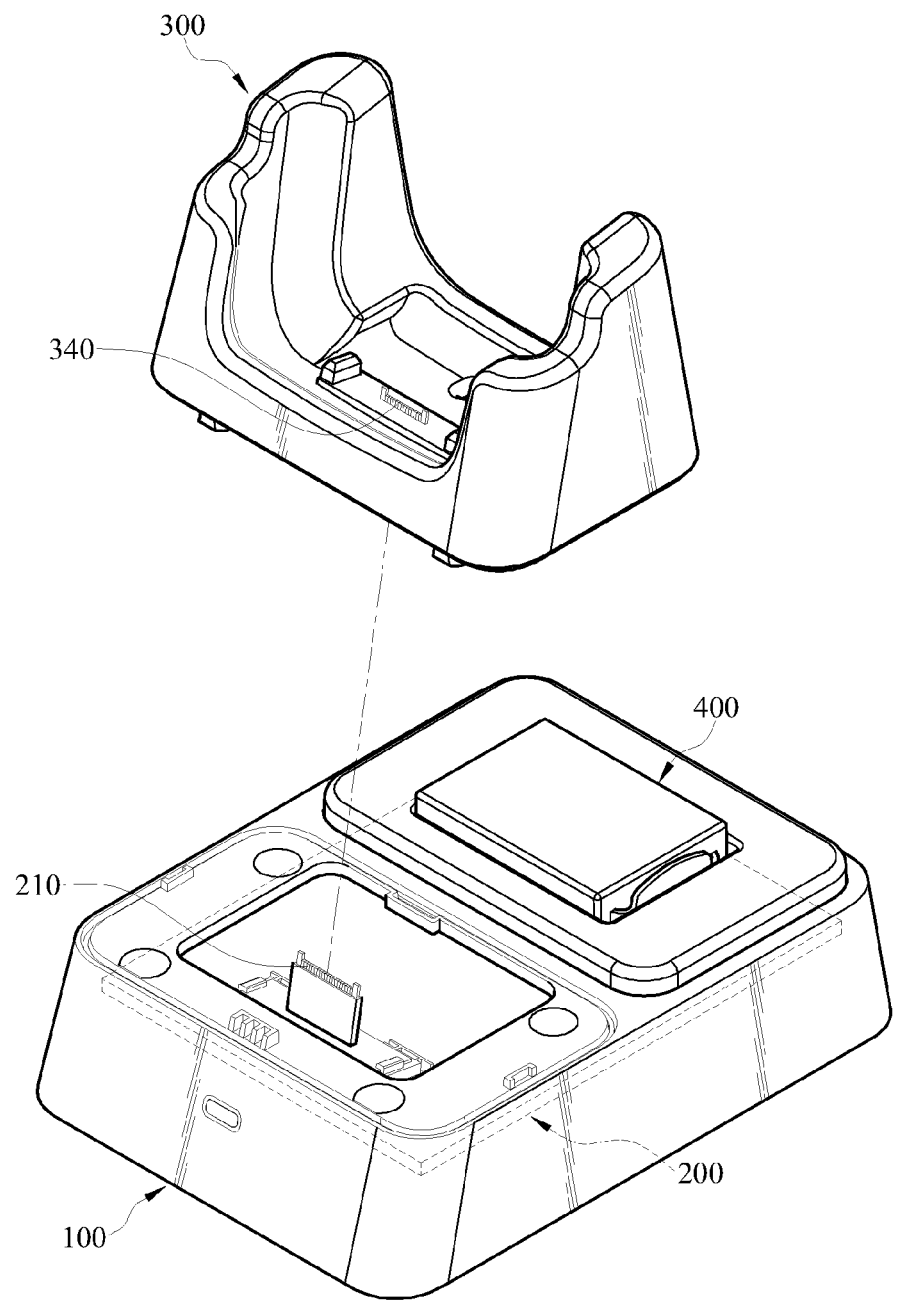
FIG. 4 is an exploded perspective view of a charger according to another embodiment of the disclosure.

The charger 10 of the embodiment in FIG. 1 is applicable for situations which the shapes of various electronic products are different and the types of the electrical connectors of various electronic products are the same, but not limited to the disclosure. In other embodiments, the charger 10 is also applicable for situations which both the shapes of various electronic products and the types of the electrical connectors are different. Please refer to FIG. 4, which is an exploded perspective view of the charger according to another embodiment of the disclosure. The charger 10 of this embodiment comprises a base 100, a charging circuit 200, a supporting stand 300 and a battery box 400. The charging circuit 200 is disposed in the base 100. The charging circuit 200 has a first electrical connector 210 which is disposed outside the base 100. The supporting stand 300 and the battery box 400 may be detachably installed on the base 100. Furthermore, the supporting stand 300 has an adaptor 340. The adaptor 340 is an electrical connector, and the standards of the adaptor 340 are different from those of the first electrical connector 210. Therefore, the standards of the electrical connector are also substituted while the user substitute the supporting stand 300 in the mean time, and an electronic product including an electrical connector with different standards may be charged.

According to the charger disclosed in the disclosure, by using the coupling portion of the base for detachably coupling with one of the supporting stands with different standards, the charger can be used for charging various electronic products by substituting the supporting stand.

Furthermore, by using the coupling indentation of the base for detachably coupling with one of the battery boxes with different standards, the charger can be used for charging various batteries by changing the battery boxes.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to activate others skilled in the art to utilize the disclosure and various embodiments and with various modifications as are suited to the particular use contemplated. Alternative embodiments will become apparent to those skilled in the art to which the disclosure pertains without departing from its spirit and scope. Accordingly, the scope of the disclosure is defined by the appended claims rather than the foregoing description and the exemplary embodiments described therein.

What is claimed is:

1. A charger, comprising:
   a base comprising a coupling portion and a coupling indentation and having an upper surface, the coupling portion being for detachably coupling with one of a plurality of supporting stands, the coupling indentation being for detachably coupling with one of a plurality of battery boxes, each of the supporting stands having a supporting container with different standards, the coupling portion having a coupling surface, the coupling surface being used for supporting one of the supporting stands; and
   a charging circuit disposed in the base and the charging circuit having a first electrical connector and a second electrical connector, wherein the first electrical connector protrudes from the coupling surface, when the coupling portion is coupled with one of the supporting stands, a portion of the first electrical connector is disposed in the supporting container, the second electrical connector is disposed in the coupling indentation, the battery boxes are used for being detachably installed in the coupling indentation, each of the battery boxes has an accommodating indentation and a third electrical connector, a portion of the third electrical connector is disposed in the accommodating indentation, the third electrical connector is used for being detachably and electrically connected to the second electrical connector, and the accommodating indentation is used for accommodating at least one battery;

wherein each of the battery boxes comprises a first fitting portion and a second fitting portion, the first fitting portion and the second fitting portion are disposed on two sides of the each of the battery boxes opposite to each other, the base comprises a third fitting portion and a fourth fitting portion, the third fitting portion and the fourth fitting portion are disposed on two sides of the coupling indentation opposite to each other, the first fitting portion is fastened with the third fitting portion, and the second fitting portion is fastened with the fourth fitting portion;

wherein the upper surface is connected with sidewalls of the coupling indentation, the second fitting portion comprises an elastic piece and a convex-shaped block, the elastic piece has a fastening section and a releasing section connected with each other, the fastening section is connected with one of the battery boxes, the fastening section is positioned between the one of the battery boxes and the base, the convex-shaped block is disposed on a surface of the fastening section facing the coupling indentation, a portion of the releasing section protrudes from the upper surface, the fourth fitting portion is a concave indentation, the convex-shaped block faces the fourth fitting portion, and the convex-shaped block is fastened with the fourth fitting portion by the elastic piece, the releasing section is adapted to being pressed to move the convex-shaped block away from the fourth fitting portion.

2. The charger as claimed in claim 1, wherein the coupling portion comprises two fastening pieces disposed on two sides of the coupling surface opposite to each other, each of the supporting stands comprises two fastening indentations disposed on two sides of the each of the supporting stands opposite to each other, the two fastening pieces are used for being fastened with the two fastening indentations correspondingly such that the each of the supporting stands is detachably fastened on the base, and the portion of the first electrical connector is disposed in the supporting container.

3. The charger as claimed in claim 1, wherein the first fitting portion is convex-shaped block, and the third fitting portion is a concave indentation.

\* \* \* \* \*